US012206200B1

(12) United States Patent
Zhou et al.

(10) Patent No.: US 12,206,200 B1
(45) Date of Patent: Jan. 21, 2025

(54) CONNECTOR AND CONNECTOR MODULE

(71) Applicant: Dongguan Plugood Technology Co., Ltd., Guangdong (CN)

(72) Inventors: Hongjun Zhou, Guangdong (CN); Difeng Liu, Guangdong (CN)

(73) Assignee: Dongguan Plugood Technology Co., Ltd., Dongguan (CN)

( * ) Notice: Subject to any disclaimer, the term of this patent is extended or adjusted under 35 U.S.C. 154(b) by 0 days.

(21) Appl. No.: 18/810,491

(22) Filed: Aug. 20, 2024

(30) Foreign Application Priority Data

Apr. 17, 2024 (CN) ......................... 202420790223.1

(51) Int. Cl.

| | |
|---|---|
| ***H01R 13/502*** | (2006.01) |
| ***H01R 13/52*** | (2006.01) |
| ***H01R 13/639*** | (2006.01) |
| ***H01R 13/70*** | (2006.01) |

(52) U.S. Cl.

CPC ....... *H01R 13/502* (2013.01); *H01R 13/5202* (2013.01); *H01R 13/639* (2013.01); *H01R 13/70* (2013.01)

(58) Field of Classification Search

CPC H01R 13/502; H01R 13/5202; H01R 13/639; H01R 13/70

See application file for complete search history.

(56) References Cited

U.S. PATENT DOCUMENTS

| | | | | |
|---|---|---|---|---|
| 8,628,362 | B2 * | 1/2014 | Maki | H01R 13/639 439/784 |
| 9,929,509 | B1 * | 3/2018 | Penn | H01R 13/6275 |
| 2012/0252282 | A1 * | 10/2012 | Maki | H01R 13/639 439/784 |
| 2016/0111808 | A1 * | 4/2016 | Droesbeke | H01R 13/506 439/660 |
| 2022/0255263 | A1 * | 8/2022 | Martin | H01R 13/62911 |
| 2023/0402791 | A1 * | 12/2023 | Chiang | H01R 13/5202 |

* cited by examiner

*Primary Examiner* — Abdullah A Riyami
*Assistant Examiner* — Nader J Alhawamdeh
(74) *Attorney, Agent, or Firm* — Andrew C. Cheng

(57) ABSTRACT

A connector includes an outer shell with opposite connecting end and rear end in an insertion direction, the connecting end being located at a front end of the outer shell, a receiving space being defined in the outer shell, an opening being defined in the connecting end; a first terminal fixed in the receiving space; a fastener being connected to and rotatable relative the outer shell about a rotary axis, the fastener including a locking portion and a button, the locking portion being set in the outer shell and extending towards the opening, the button including a pressing portion capable of being operated from outside, the pressing portion being set at a front end of the rotary axis, and the locking portion being set at a front end of the pressing portion; and an elastic member being connected to the fastener and generating an elastic force on the fastener.

17 Claims, 10 Drawing Sheets

CONNECTOR AND CONNECTOR MODULE

CROSS-REFERENCE TO RELATED APPLICATIONS

This application claims priority to Chinese Patent Application No. 202420790223.1, filed on Apr. 17, 2024, the entire contents of which are hereby incorporated by reference.

TECHNICAL FIELD

This application relates to the technical field of electrical connection devices, and in particular, to a connector and connector module.

BACKGROUND

Connector modules are devices used to achieve electrical connection between different devices. The application of the connector modules can improve the efficiency of electrical connecting operations between different devices. At present, the connector modules have been widely used in fields such as automotive, communication, consumer electronics, data processing, industrial machinery, and etc.

The connector module generally includes two connectors, which can achieve electrical connection. One of the two connectors may be used as a socket, fixed on a device, a panel, or a circuit board. The other connector may be used as a plug, connected to an end of a cable. The two connectors are generally connected by a locking component, thereby maintaining a relative position, achieving stable electrical connection.

The locking component of the conventional connector module generally includes a button and a fastener, wherein a pivot point of the locking component is set between the button and the fastener. Generally, the user operates the button to make the fastener swing about the pivot point, so that the two connectors are disengaged from each other. However, in order to ensure a compactness of the connector module, an overall length of the locking component is limited. Due to the fact that the pivot point of the locking component is set between the button and the fastener, a sum of the length of force arm of the button and the length of force arm of the fastener is generally the same as an overall length of the locking component. At the same time, to ensure a range of motion of the fastener, the length of force arm of the fastener should not be too small. Therefore, in condition that the overall length of the locking component is constant, the length of force arm of the button is generally limited, making the operation of pressing the button be laborious.

SUMMARY

Based on this, the present disclosure provides a connector and a connector module that can solve or at least improve the above-mentioned technical problem.

The present disclosure provides a connector, includes:

an outer shell including a connecting end and a rear end that are opposite to each other in an insertion direction, the connecting end being located at a front end of the outer shell in the insertion direction, a receiving space being defined in the outer shell, an opening being defined in the connecting end of the outer shell, wherein a direction from the front end towards the rear end of the outer shell is opposite to the insertion direction;

a first terminal being fixed in the receiving space of the outer shell;

a fastener being connected to the outer shell and rotatable relative the outer shell about a rotary axis, the fastener including a locking portion and a button that are connected to each other, the locking portion being set in the outer shell and extending towards the opening of the outer shell, the button including a pressing portion that is capable of being operated from an outside of the outer shell, wherein, along the insertion direction, the pressing portion of the button is set at a front end of the rotary axis, and the locking portion is set at a front end of the pressing portion of the button;

an elastic member being connected to the fastener and generating an elastic force on the fastener, wherein the elastic force is capable of causing the button to move towards the outside of the outer shell.

For the above connector, when the fastener rotates, the locking portion displaces and disengages from another connector, so that the connector can move away from the other connector in a direction opposite to the insertion direction. In case that the distance between the locking portion and the rotary axis is constant, since the pressing portion of the button is set at the front end of the rotary axis, and the locking portion is set at the front end of the pressing portion of the button, the overall length of the fastener is generally the same as a distance between the locking portion and the rotary axis, and the pressing portion is located between the rotary axis and the locking portion. Due to the constant distance between the locking portion and the rotary axis, the length of force arm of the locking portion will not be affected by the change in the length of force arm of the pressing portion. Therefore, the locking portion can have a sufficient range of motion, so as to smoothly complete the snap-fitting or release of the snap-fitting. Due to the fact that increasing the distance between the pressing portion and the rotary axis does not result in a reduction in the length of force arm of the locking portion, and a sum of the length of force arms of the locking portion and pressing portion is greater than the overall length of the fastener, in condition that the overall length of the fastener is unchanged, increasing the upper limit of the length of force arm of the pressing portion is beneficial for reducing the force required to press the pressing portion.

In some embodiments, along the insertion direction, the pressing portion is at least partially located between the locking portion and the rotary axis.

In some embodiments, the button includes a front end and a rear end that are opposite to each other along the insertion direction, the pressing portion is set adjacent to the front end of the button, and the rear end of the button is rotatably connected to the outer shell through a rotating shaft.

In some embodiments, the pressing portion includes a middle section and an external section, the middle section is set between the rotary axis and the locking portion, the external section is connected to an end of the middle section away from the outer shell, and at least a part of the external section extends in a direction away from the rotary axis relative to the middle section.

In some embodiments, in a natural state, an outer surface of the button is inclined and extends gradually towards the outer shell along a direction from the front end to the rear end of the button.

In some embodiments, the fastener further includes a bending portion connected to the pressing portion, the bending portion is connected between the pressing portion and the locking portion, the locking portion is connected to a side of the bending portion away from an inner wall surface of the outer shell, and the locking portion extends substantially along the insertion direction.

In some embodiments, the outer shell is provided with a through groove, and the pressing portion is received in the through groove partially.

In some embodiments, a part of an inner wall surface of the outer shell is recessed towards an outer wall surface of the outer shell to form a guiding groove which extends to the connecting end of the outer shell, and the locking portion is received in the guiding groove.

In some embodiments, the outer shell includes a main portion and a convex portion connected to the main portion, the locking portion is received in the convex portion, and the elastic member is held between the pressing portion and the main portion.

In some embodiments, the locking portion is provided with a locking block or a locking slot; and when the locking portion is provided with the locking block, the locking block is provided with a guiding slope and a locking surface, and the guiding slope is inclined relative to the locking surface.

In some embodiments, a surface of the outer shell facing to the pressing portion is provided with a first position limit groove, and an end of the elastic member is received in the first position limit groove; and, a side of the pressing portion facing to the outer shell is provided with a second position limit groove, and another end of the elastic member is received in the second position limit groove.

In some embodiments, the connector further includes an inner shell and a tailpipe received in the outer shell, a rear end of the inner shell is connected to and communicates with one end of the tailpipe.

In some embodiments, the connector further includes a fastening cap threaded in the outer shell, an inner side of the outer shell is provided with position limit step surface which is away from the connecting end, the inner shell abuts against the position limit step surface, an end of the inner shell away from the connecting end abuts against the one end of the tailpipe, and another end of the tailpipe is received in the fastening cap and abuts against an inner wall surface of the fastening cap.

In some embodiments, a sealing ring is mounted around the one end of the tailpipe facing to the inner shell, and abuts against an end of the inner shell.

In some embodiments, the connector further includes a first insulation member, a second insulation member, and a sealing gasket, the first insulation member and the second insulation member are received in the inner shell, the sealing gasket is held between the first insulation member and the second insulation member, the first terminal is inserted in the first insulation member, the second insulation member, and the sealing gasket; wherein an outer circumference of the sealing gasket is provided with a first circumferential flange which abuts against the inner wall surface of the inner shell and has a width decreasing along a direction towards the outer circumference; or an inner circumference of the sealing gasket is provided with a second circumferential flange which abuts against an outer circumferential surface of the first terminal and has a width decreasing along a direction towards the inner circumference.

In some embodiments, a sealing ring is mounted around an end of the tailpipe facing to the inner shell, and a position limit protrusion is provided on an outer circumference of the tailpipe and embedded in the sealing ring.

The present disclosure further provides a connector module that includes a first connector and a second connector, the first connector is the connector defined above, the second connector includes a housing, a latching portion being fixed on the housing and configured for cooperating with the locking portion of the first connector, and a second terminal at least partially received in the housing. When the first connector and the second connector are plugged and connected, the second terminal is in contact with and electrically connected to the first terminal.

REFERENCE NUMBERS IN THE DRAWINGS

Figure 1:
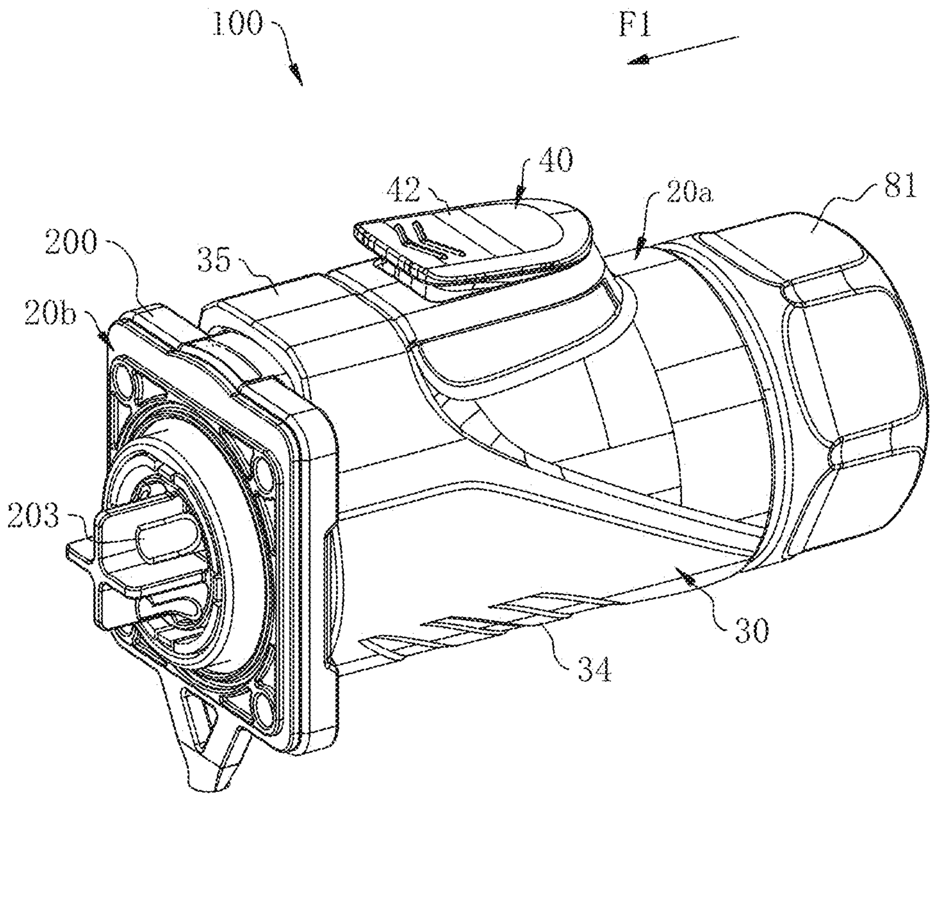
FIG. 1 is a schematic, assembled view of a connector module according to an embodiment of the present disclosure.

100, connector module;
**20*a*/20*b***, connector;
30, outer shell;
31, connecting end;
32, through groove;
33, guiding groove;
34, main portion;
341, column core;
342, main chamber;
35, convex portion;
36, first position limit groove;
37, circumferential wall;
38, position limit step surface;
40, fastener;
41, locking portion;
411, locking slot;
42, pressing portion;
421, middle section;
422, external section;
423, second position limit groove;
43, pivot portion;
44, being portion;
50, elastic member;
60, shaft;
70, inner shell;
71, first insulation member;
72, second insulation member;
73, first terminal;
74, sealing gasket;
741, first circumferential flange;
742, second circumferential flange;
75, position limit step surface;
80, tailpipe;

81, fastening cap;
82, sealing ring;
83, position limit protrusion;
84, sealing ring;
85, claw piece;
200, housing;
201, latching portion;
202, latching block;
202*a*, contact surface;
203, second terminal;
204, locking component; and
F1, insertion direction.

DESCRIPTION OF THE EMBODIMENTS

The present disclosure will be further described below with reference to the accompanying drawings and embodiments, in which the same or similar reference numerals represent the same or similar components or components with the same or similar functions throughout. The embodiments described below with reference to the accompanying drawings are exemplary, and are only used to explain the present disclosure but should not be construed as a limitation to the present disclosure.

It should be understood that the terms "upper", "lower", "left", "right", "front", "rear", "length", "width", "horizontal", "vertical", "top", "bottom", "inside", and "outside" used in the expressions of the present disclosure to indicate an orientation or positional relationship are all based on the orientation or positional relationship shown in the accompanying drawings, which are intended to facilitate the description of the present disclosure and simplify the description, and cannot be understood as a limitation that the referred device or component must have a specific orientation or a specific positional relationship.

In addition, the terms "first" and "second" are only used for the purpose of discriminative description, and have no connotation of relative importance, nor do they indicate or imply the number of technical features. Thus, a feature defined with "first" or "second" may expressly or implicitly that there are one or more features including that feature. In the description of the present disclosure, "a plurality of" means two or more, unless otherwise specifically defined.

Unless otherwise specified, terms such as "connection" and "fixed" in the present disclosure should be understood in a broad sense, for example, it may be a fixed connection, a detachable connection, or an integral forming; it may be a direct connection, or an indirect connection through an intermediate medium. Those of ordinary skill in the art may understand specific meanings of the foregoing terms in the present disclosure based on a specific situation.

Technical solutions provided by embodiments of the present disclosure will be described in combination with the accompanying drawings.

Referring to FIG. 1 to FIG. 10, the present disclosure provides a connector module 100, which may be used to achieve electrical connection between different devices. Specifically, the connector module 100 may be used for electrical energy transmission or electronic signal transmission.

Figure 2:
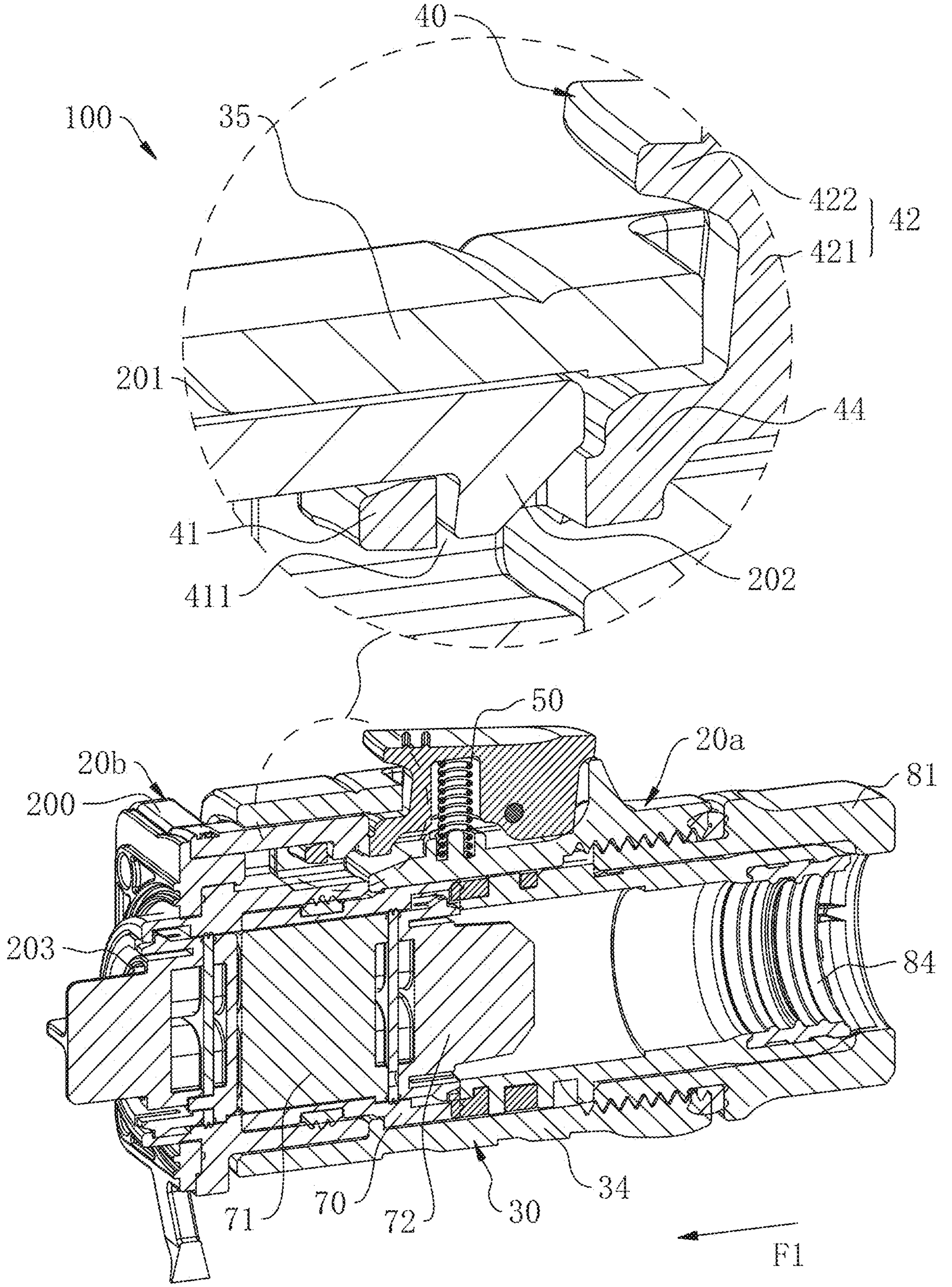
FIG. 2 is a cross sectional view of the connector module of FIG. 1.
Figure 3:
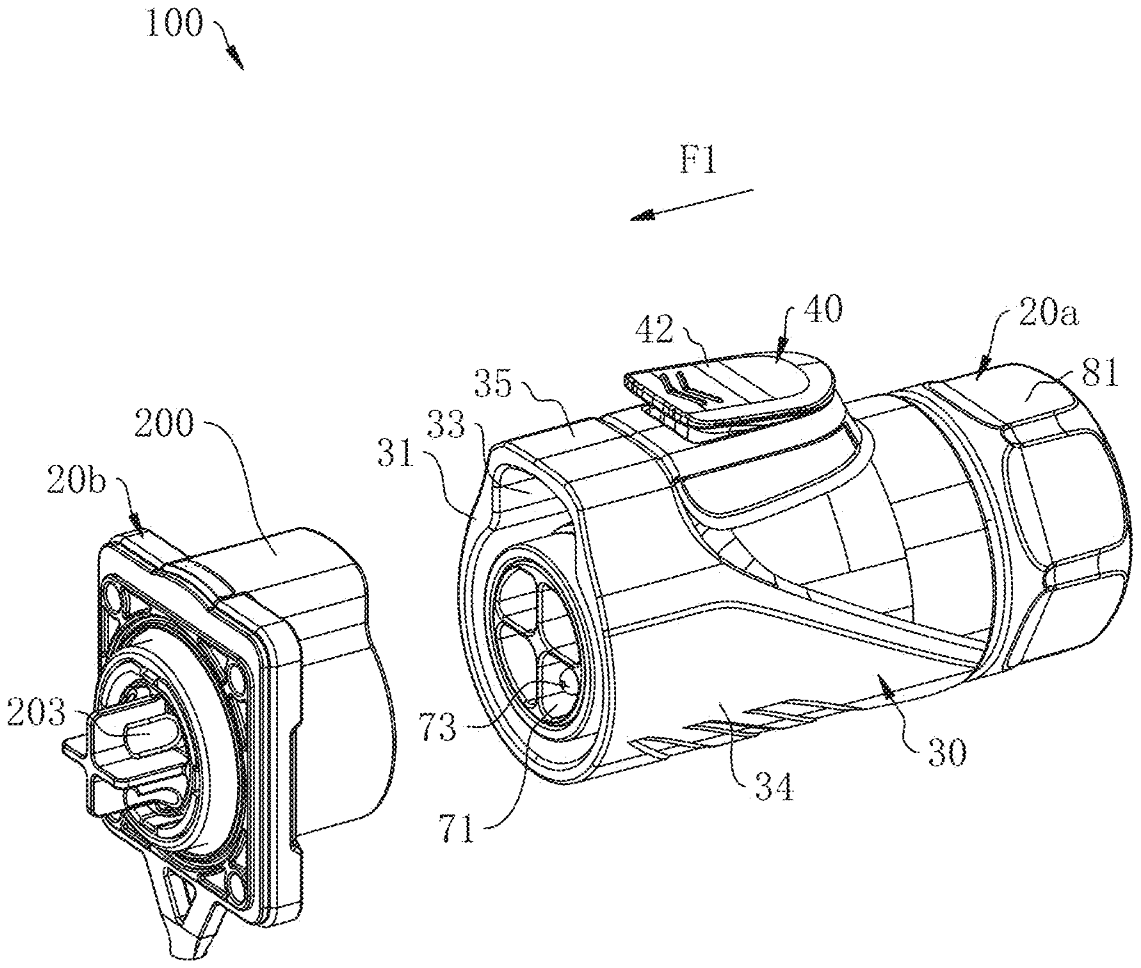
FIG. 3 is an exploded view of the connector module of FIG. 1.

Referring to FIG. 1 to FIG. 3, the connector module 100 includes two connectors that can be connected to each other. In some embodiments, the two connectors that can be connected to each other are defined as a first connector and a second connector. In some embodiments, the first connector is used to connect a device electrically, and the second connector is used to connect another device electrically. When the first connector and the second connector are connected mechanically and electrically, electrical energy or electronic signal can be transmitted between the two devices. In other embodiments, the first connector and the second connector may be used to transmit electrical energy or electronic signal between two different modules of the same device.

In some embodiments, the first connector and the second connector are connected by snap-fitting, so as to lock a relative position of the first connector and the second connector on the aspect of mechanism. In some embodiments, when the first connector and the second connector are connected by snap-fitting, ports of the first connector and the second connector are kept in a contact state.

In some embodiments, a connector 20*b* of the connector module 100 may serve as a socket, fixed to a device, a panel, or a circuit board. In an embodiment, the connector 20*b* may be fixed to a wall surface of a cabinet of the device. Another connector 20*a* of the connector module 100 may serve as a plug and is connected to another device through an electrical cable.

The present disclosure further provides a connector. In some embodiments, the connector serves as a plug. In other embodiments, the connector serves as a socket.

Figure 4:
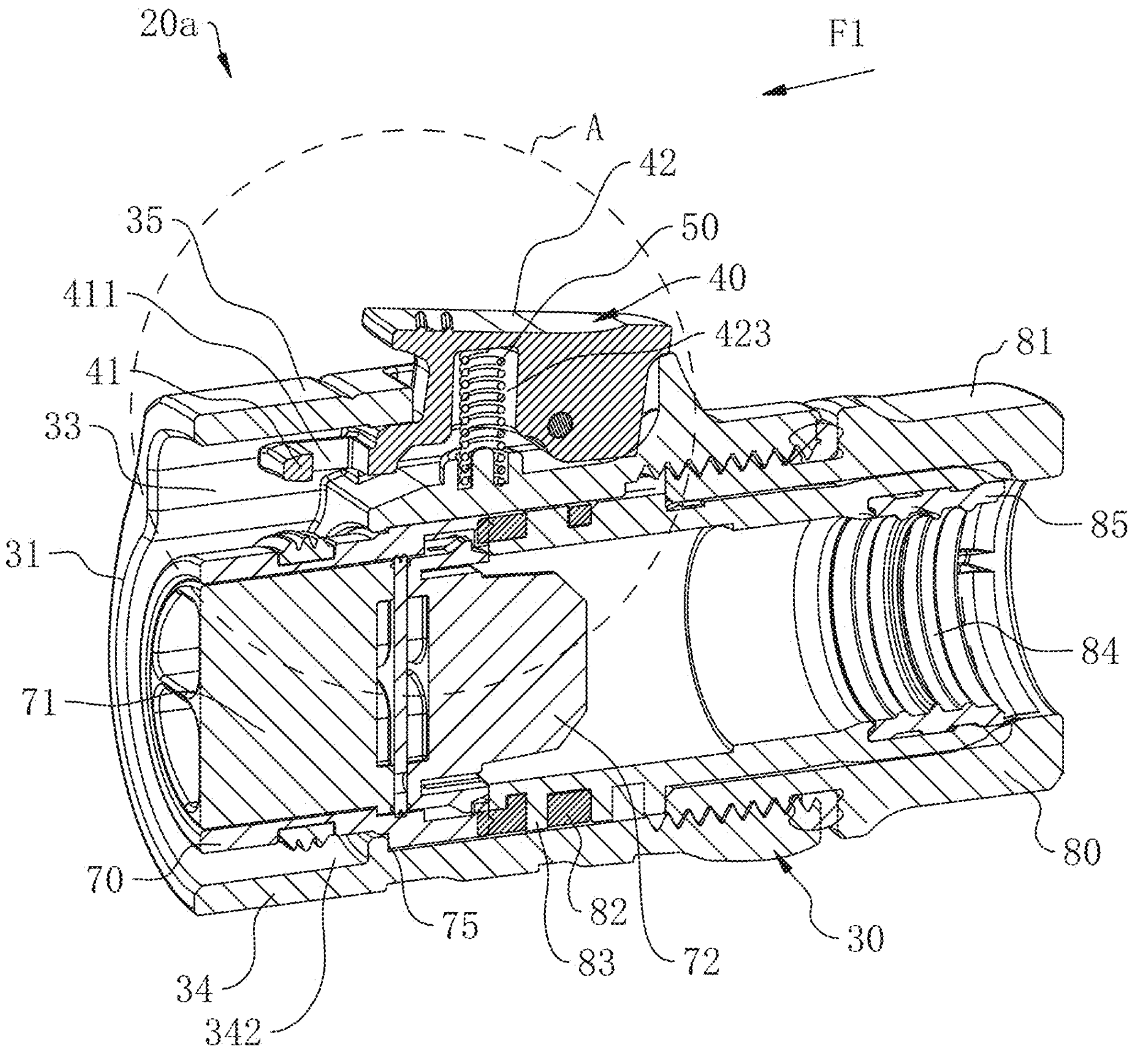
FIG. 4 is a cross sectional view of a connector of the connector module of FIG. 3.

Referring to FIG. 3 and FIG. 4, the connector 20*a* includes an outer shell 30, a first terminal 73, a fastener 40, and an elastic member 50. The outer shell 30 includes a connecting end 31 and a rear end that are opposite to each other along an insertion direction F1. The connecting end 31 is located at a front end of the outer shell 30 in the insertion direction F1. A receiving space is defined inside the shell 30, and an opening is defined at the connecting end 31 of the shell 30. A direction from the front end of the shell 30 to the rear end of the shell 30 is opposite to the insertion direction F1. The first terminal 73 is fixed in the receiving space of the outer shell 30. The fastener 40 is connected to the outer shell 30 and can rotate relative to the outer shell 30 about a rotary axis. The fastener 40 includes a locking portion 41 and a button that are connected with each other. The locking portion 41 is set in the outer shell 30 and extends towards the opening of the outer shell 30. The button includes a pressing portion 42 that can be operated from an outside of the outer shell 30. Along the insertion direction F1, the pressing portion 42 of the button is set at a front end of the rotary axis, and the locking portion 41 is set at a front end of the pressing portion 42 of the button. The elastic member 50 is connected to the fastener 40 and generates an elastic force on the fastener 40, wherein the elastic force can causes the button to move towards the outside of the outer shell 30.

Specifically, when the two connectors need to be connected and matched, the connecting end 31 of the connector 20*a* is inserted into the other connector 20*b* along the insertion direction F1. The locking portion 41 of the connector 20*a* is used to connect the other connector 20*b* via snap-fitting, so that the two connectors are locked in a stable relative position. When the connected two connectors need to be detached, an external force is applied to the pressing portion 42 of the button, causing the fastener 40 to compress the elastic member 50, and the locking portion 41 to rotate about the rotary axis along a direction towards an internal center of the outer shell 30. During rotation of the fastener 40, the locking portion 41 is displaced and detached from the other connector 20*b*, so that the connector 20*a* can move to detach from the other connector 20*b* in a direction opposite to the insertion direction F1.

In case that the overall length of the fastener 40 is constant, due to the fact that the pressing portion 42 of the button is set at the front end of the rotary axis, and the locking portion 41 is set at the front end of the pressing portion 42 of the button, the pressing portion 42 is located between the rotary axis and the locking portion 41, and a distance between the locking portion 41 and the rotary axis is generally the same as the overall length of the fastener 40. Due to the constant distance between the locking portion 41 and the rotary axis, the length of force arm of the locking portion 41 will not be affected by the change in the length of force arm of the pressing portion 42. Therefore, the locking portion 41 can have a sufficient range of motion, so as to smoothly complete the snap-fitting or release of the snap-fitting. Due to the fact that increasing the distance between the pressing portion 42 and the rotary axis does not result in a reduction in the length of force arm of the locking portion 41, and a sum of the length of force arms of the locking portion 41 and the pressing portion 42 is greater than the overall length of the fastener 40, in condition that the overall length of the fastener 40 is unchanged, increasing the upper limit of the length of force arm of the pressing portion 42 is beneficial for reducing the force required to press the pressing portion 42.

In some embodiments, the length of force arm of the locking portion 41 is the distance between the locking portion 41 and the rotary axis. The length of force arm of the pressing portion 42 is the distance between the pressing portion 42 and the rotary axis.

In some embodiments, due to the fact that a part of the pressing portion 42 is located between the rotary axis and the locking portion 41, according to the lever principle, when such part of the pressing portion 42 is pressed down, at the same rotation angle, a moving distance of the locking portion 41 towards an internal of the outer shell 30 is greater than that of the pressing portion 42. Thus, when the pressing portion 42 is pressed down with a small moving distance, the locking portion 41 can have a large moving distance, which can improve the operational efficiency of the fastener 40, enabling the locking portion 41 to detach from the other connector 20*b* quickly. At the same time, due to the fact that the locking portion 41 has a large moving distance during releasing the snap-fitting, the locking portion 41 can be further away from the latching portion 201 of the other connector 20*b*, thereby allowing the locking portion 41 to more reliably release the snap-fitting with the other connector 20*b*.

In some embodiments, the connecting end 31 of the outer shell 30 has a considerable amount of internal space since it requires nested fitting. The locking portion 41 is close to the connecting end 31 relative to the pressing portion 42. For a part of the outer shell 30 corresponding to the pressing portion 42, a certain internal insulation space is generally required to accommodate insulation materials or electrical cables therein. Due to the small range of motion of the pressing portion 42, it avoids the need to set a larger avoidance space in the outer shell 30 for the pressing portion 42, which is beneficial for forming a larger internal insulation space in the outer shell 30.

In some embodiments, referring to FIG. 1 to FIG. 3, the other connector 20*b* serves as the second connector. The connector 20*a* serves as the first connector. The second connector includes a housing 200, a latching portion 201 fixed on the housing 200, and a second terminal 203 at least partially disposed in the housing 200. When the first connector and the second connector are plugged and connected, the second terminal 203 is in contact with and electrically connected to the first terminal 73. The latching portion 201 is used to cooperate with the locking portion 41 of the first connector by snap-fitting.

In some embodiments, referring to FIG. 4, the pressing portion 42 is exposed outside the outer shell 30, which allows the user to operate the button directly, thereby avoiding the need of other components for transmission, which is beneficial for simplifying the structure of the connector 20*a*.

In some embodiments, referring to FIG. 2, the locking portion 41 is provided with a locking slot 411. The latching portion 201 of the other connector 20*b* is provided with a latching hook 202. A direction in which the latching hook 202 enters the locking slot 411 is perpendicular or substantially perpendicular to the relative moving direction of the two connectors when they are connected. This relative moving direction may be understood as the insertion direction F1. Therefore, when the latching hook 202 is engaged into the locking slot 411, the two connectors are prevented from detaching from each other through the abutment of the latching hook 202 against a wall surface of the locking slot 411.

In some embodiments, an edge of an open side of the locking slot 411 may be triangular, rectangular, circular, or other shapes that can accommodate the latching hook 202 therein. The locking portion 41 may be provided with one locking slot 411 or multiple locking slots 411. In some embodiments, there may be two locking slots 411 set on opposite sides of the locking portion 41, respectively. In some embodiments, the latching portion 201 and the locking portion 41 may be configured with any other shapes that can achieve snap-fitting.

In some embodiments, at least one of engaging surfaces between the locking slot 411 and the latching hook 202 is inclined relative to the insertion direction F1. In some embodiments, the engaging surface is a wall surface of the locking slot 411 that can restrict the movement of the latching hook 202 when the two connectors have a tendency to move apart. Alternatively, referring to FIG. 2, the engaging surface 202*a* is a surface of the latching hook 202 that can restrict the movement of the locking portion 41 when the two connectors have a tendency to move apart.

In some embodiments, when the fastener 40 is in a natural state and the two connectors have a tendency to move apart, the wall surface of the locking slot 411 acts as the engaging surface and has an inclined angle, generating a component force that causes the latching hook 202 to penetrate into the locking slot 411. In other embodiments, referring to FIG. 2, in the direction of penetrating into the locking slot 411, the engaging surface of the latching hook 202 is inclined towards a side away from the rotary axis.

In some embodiments, the locking portion 41 is provided with a locking block. The latching portion 201 of the other connector 20*b* is provided with a latching slot. A direction in which the locking block enters the latching slot is perpendicular or substantially perpendicular to the relative moving direction of the two connectors when they are connected. Therefore, when the locking block is engaged into the latching slot, the two connectors are prevented from detaching from each other through the abutment of the locking block against a wall surface of the latching slot. In other embodiments, the locking block may be used to achieve a snap-fitting connection with the latching hook 202.

In some embodiments, the locking block is provided with a guiding slope and a locking surface, wherein the guiding slope and the locking surface are inclined relative to each other. The guiding slope is inclined relative to the relative moving direction of the two connectors when they are connected, while the locking surface is perpendicular or substantially perpendicular to the relative moving direction. The guiding slope is set away from the pressing portion 42 relative to the locking surface. When the latching portion 201 of the other connector 20*b* enters the connecting end 31 of the outer shell 30, the latching portion 201 abuts against the guiding slope and causes the fastener 40 to rotate in a direction of compressing the elastic member 50 by means of squeezing the guiding slope. When the latching portion 201 reaches a certain stroke in the direction of entering the connecting end 31, the locking block is engaged into the latching slot of the latching portion 201. The locking surface abuts against the wall surface of the latching slot, so that it can prevent the latching portion 201 from exiting from the connecting end 31 of the outer shell 30. In some embodiments, the locking surface may be planar. In other embodiments, according to a principle of fitting the locking surface as closely as possible with the wall surface of the latching slot, the locking surface may be configured with a shape corresponding to that of the wall surface of the latching slot. In some embodiments, the locking surface may serve as the engaging surface, tilted relative to the insertion direction F1.

Figure 6:
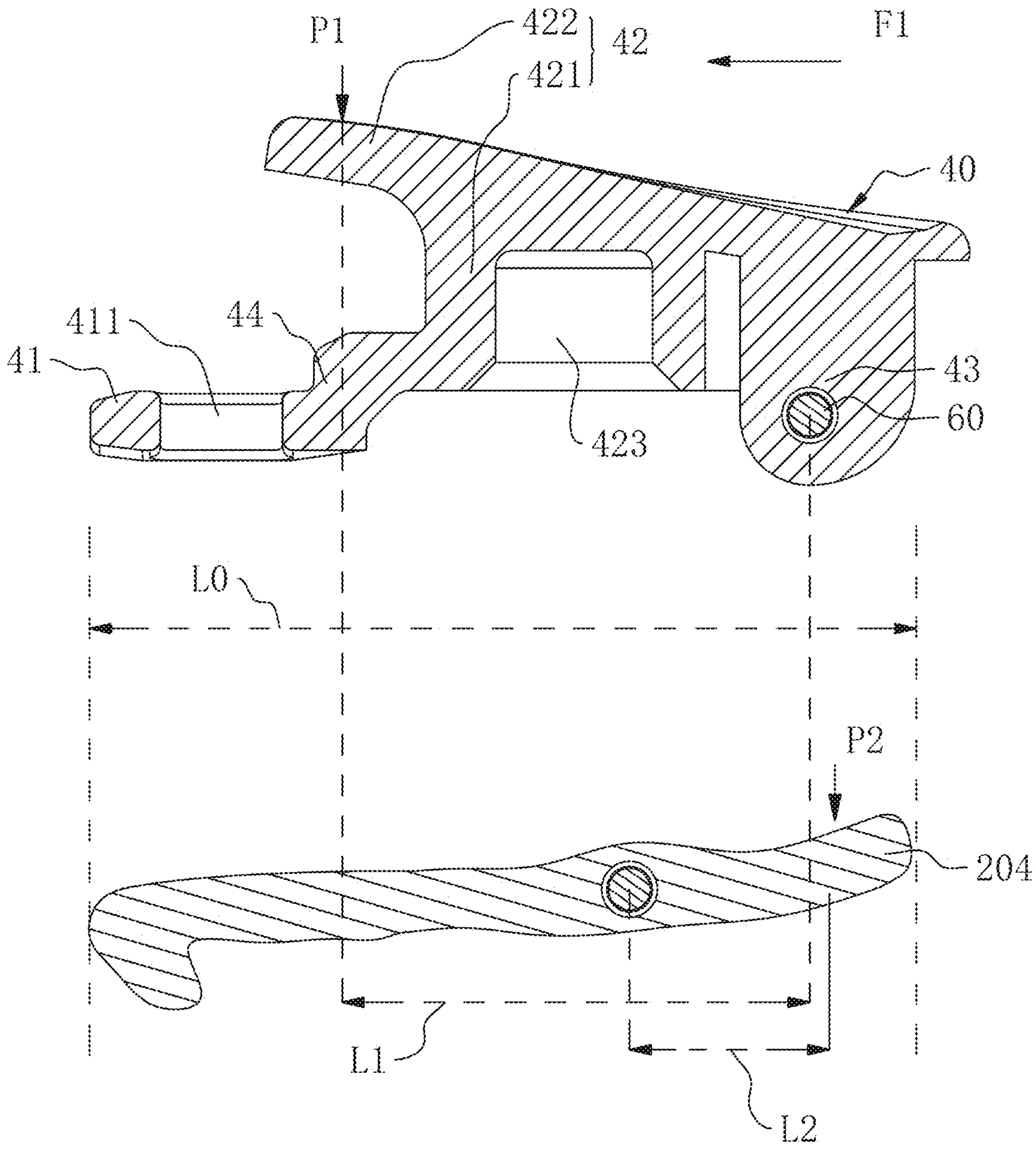
FIG. 6 is a schematic plan view of a fastener of the connector of FIG. 5.

In some embodiments, referring to FIG. 6, in the insertion direction F1, the pressing portion 42 is at least partially located between the locking portion 41 and the rotary axis, so that the pressing portion 42 may serve as an intermediate connection. In some embodiments, a part of the button is arranged around the rotary axis, and the pressing portion 42 is connected between such part of the button and the locking portion 41.

In some embodiments, referring to FIG. 6, a distance between the front end of the button and the rotary axis is larger, thus it is labor-saving to press down the front end of the button. In a natural state, the outer surface of the button is inclined and gradually extends towards the outer shell 30 from the front end of the button to the rear end of the button. Therefore, a protruding degree of the front end of the button relative to the outer shell 30 is greater than that of the rear end of the button. When the front end of the button is pressed down, it can avoid the front end of the button from totally retracting into the outer shell 30. Therefore, the finger, which presses the front end of the button, is not easily blocked by an edge of the outer shell 30, which improves the comfort of operation at the front end of the button. In some embodiments, an outer surface of the pressing portion 42 serves as the outer surface of the button.

Figure 5:
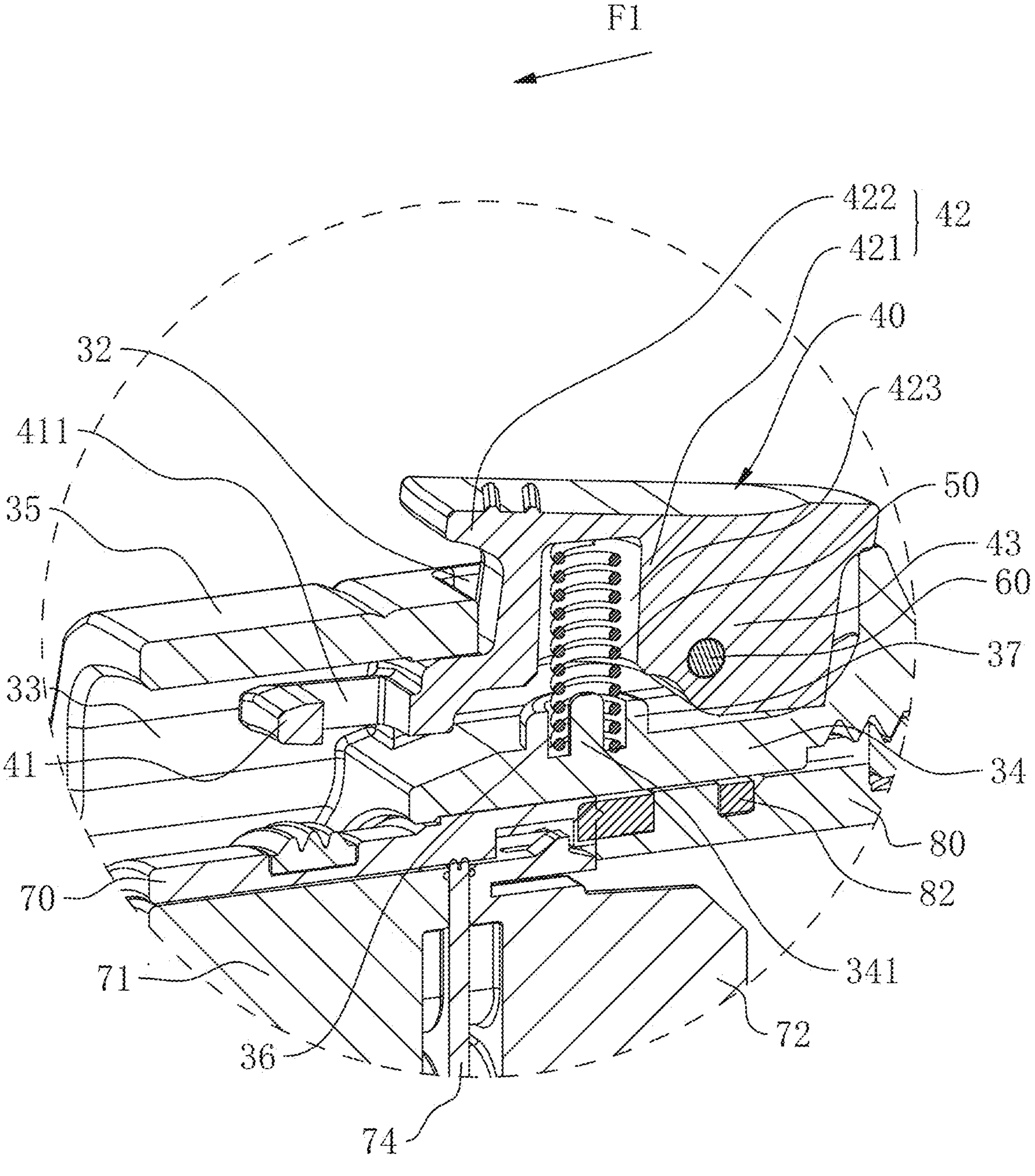
FIG. 5 is an enlarged view of a portion A of the connector of FIG. 4.

In some embodiments, referring to FIG. 4 and FIG. 5, the pressing portion 42 includes a middle section 421 and an external section 422. The middle section 421 is set between the rotary axis and the locking portion 41. The external section 422 is connected to an end of the middle section 421 that is away from the outer shell 30, and a part of the external section 422 extends in a direction away from the rotary axis relative to the middle section 421. Due to the fact that the external section 422 is connected to the end of the middle section 421 that is away from the outer shell 30, the external section 422 is set away from the center of the outer shell 30 relative to the middle section 421. When the fastener 40 rotates, the outer part 422 is not easily to contact the surface of the outer shell 30. In addition, due to the fact that the external section 422 extends in the direction away from the rotary axis relative to the middle section 421, according to the lever principle, a smaller downward force may cause the fastener 40 to overcome the elastic force of the elastic member 50 to rotate when the force is applied to such part of the external section 422.

In some embodiments, one end of the middle section 421 is away from the center of the outer shell 30 and connected to the external section 422. In some embodiments, in a direction that the rotary axis and the locking portion 41 face to each other, the middle section 421 is located between the rotary axis and the locking portion 41.

In some embodiments, referring to FIG. 6, an overall length of the present fastener 40 and an overall length of a conventional locking component 204 both are L0. When the fastener 40 is pressed at point P1, the length of force arm is approximately L1. When the locking component 204 is pressed at point P2, the length of force arm is approximately L2. For the locking component 204, in order to ensure the range of motion of its left end, the pivot point needs to have a certain distance from the left end. Otherwise, due to insufficient range of motion, it may be impossible to complete the snap-fitting or release the snap-fitting. Therefore, actually L2 is smaller, and is relatively small compared to a difference between L2 and L0, making it be quite laborious to press the button at point P2. By means of setting the external section 422, and a part of the external section 422 extending in a direction away from the rotary axis relative to the middle section 421, L1 may be closer L0. Therefore, it is labor-saving during pressing the pressing portion 42.

In some embodiments, according to the adjustment requirements of the pressing force, a distance between the part of the external section 422 and the rotary axis may be equal to a distance between the locking portion 41 and the rotary axis. In other embodiments, the distance between the part of the external section 422 and the rotary axis may be greater than a distance between the locking portion 41 and the rotary axis.

In other embodiments, it is also possible to reduce the length of force arm by pressing other positions of the pressing portion 42 adjacent to the locking portion 41, thereby achieving a more labor-saving effect during pressing the button.

In some embodiments, referring to FIG. 3, there are some parts of the external section 422 extending along a direction towards other part of an outer peripheral of the middle portion 421, thereby increasing an end face area of the pressing portion 42, allowing for a larger contact area between the pressing portion 42 and the operator's finger, improving the comfort during operation.

In other embodiments, the pressing portion 42 may be only consisted of the middle section 421.

In some embodiments, referring to FIG. 5 and FIG. 6, the button includes a front end and a rear end which are opposite to each other in the insertion direction F1. The pressing portion 42 is set adjacent to the front end of the button, and the rear end of the button is rotatably connected to the outer shell 30 through a rotating shaft, thereby achieving rotation of the button relative to the outer shell 30. Due to the fact that the locking portion 41 is set at the front end of the pressing portion 42 of the button, and the pressing portion 42 is set adjacent to the front end of the button, the pressing portion 42 is located between the locking portion 41 and the rear end of the button, so that the movement amplitude of the locking portion 41 can be greater than that of the pressing portion 42.

In some embodiments, referring to FIG. 5, the button further includes a pivot portion 43. The rotary axis extends through the pivot portion 43. In some embodiments, the middle section 421 is connected between the pivot portion 43 and the locking portion 41. In other embodiments, the pivot portion 43 is pivotally connected to the outer shell 30.

In some embodiments, referring to FIG. 4 and FIG. 5, the locking portion 41 is received in the outer shell 30. During releasing the snap-fitting, by means of pressing down the pressing portion 42 towards the internal of the outer shell 30, the locking portion 41 moves synchronously towards the internal of the outer shell 30 under the driving of the pressing portion 42. Therefore, the locking portion 41 will not interfere with the inner wall surface of the outer shell 30 during the process of releasing the snap-fitting. Due to the fact that the locking portion 41 is received in the outer shell 30, the outer shell 30 can provide protection for the locking portion 41 and avoid external interference to the movement of the locking portion 41.

In other embodiments, the locking portion 41 and the pressing portion 42 may be exposed outside the outer shell 30.

In some embodiments, when the two connectors are connected, the connecting end 31 of the outer shell 30 may be used to receive an end of the other connector 20*b*, and the locking portion 41 is connected to the end of the other connector 20*b* by snap-fitting.

In some embodiments, referring to FIG. 2 and FIG. 5, the fastener 40 may further includes a bending portion 44 that is connected to the pressing portion 42. The being portion 44 is connected between the pressing portion 42 and the locking portion 41. The locking portion 41 is connected to a side of the bending portion 44 that is away from the inner wall surface of the outer shell 30. The bending portion 44 is used to abut against the inner wall surface of the outer shell 30, so as to balance the elastic force generated by the elastic member 50 on the fastener 40, thus the fastener 40 can be maintained at a stable position. Due to the fact that the locking portion 41 is set away from the inner wall surface of the outer shell 30 relative to the bending portion 44, a gap is defined between the locking portion 41 and the inner wall surface of the outer shell 30 when the bending portion 44 abuts against the inner wall surface of the outer shell 30. Due to the fact that snap-fitting is released by means of movement of the locking portion 41 in a direction away from the inner wall surface of the outer shell 30 and achieved by means of movement of the locking portion 41 in a direction close to the inner wall surface of the outer shell 30, when the gap is formed between the locking portion 41 and the inner wall surface of the outer shell 30, it can provide a space for extending of the end of the other connector 20*b* therethrough, thereby preventing the end of the other connector 20*b* from being blocked by the locking portion 41 when it enters the connecting end 31 of the outer shell 30.

In some embodiments, referring to FIG. 5 and FIG. 6, when the fastener 40 is in a natural state, a side of the bending portion 44 adjacent to the inner wall surface of the inner shell abuts against the outer shell 30. In some embodiments, in the natural state, the locking portion 41 extends substantially along the insertion direction F1.

In some embodiments, when the fastener 40 is configured without the bending portion 44, and the locking portion 41 abuts against the inner wall surface of the outer shell 30 directly. It is also possible to form a slope on the locking portion 41, thereby utilizing the guidance of the slope to allow a part of an end of the other connector 20*b* to be inserted into a position between the locking portion 41 and the inner wall surface of the outer shell 30.

In some embodiments, referring to FIG. 5 and FIG. 6, the outer shell 30 is provided with a through groove 32, and the pressing portion 42 is partially received in the through groove 32. The fastener 40 extends from the internal of the outer shell 30 to the outside of the outer shell 30 via the through groove 32, and a part of the pressing portion 42 is movably set in the through groove 32. Since the pressing portion 42 passes through the through groove 32, the operator may apply a force on the pressing portion 42 from the outside of the outer shell 30. In some embodiments, the middle section 421 is movably received in the through groove 32, and the external section 422 is set outside the outer shell 30. In some embodiments, the pivot portion 43 is also movably received in the through groove 32.

In other embodiments, a part of the wall of the outer shell 30 may cover the outer side of the pressing portion 42, wherein such part of the wall of the outer shell 30 may be designed as a flexible structure. The operator may apply a force to the pressing portion 42 by way of making such part of the wall of the outer shell 30 deform.

In some embodiments, referring to FIG. 2 and FIG. 5, a part of an inner wall surface of the outer shell 30 is recessed towards an outer wall surface of the outer shell 30 to form a guiding groove 33. The guiding groove 33 extends to the connecting end 31 of the outer shell 30. The locking portion 41 is received in the guiding groove 33. The guiding groove 33 is used to provide a position limit function for the latching portion 201 of the other connector 20*b*. When the two connectors are connected, the latching portion 201 of the other connector 20*b* enters the guiding groove 33. Due to the fact that the locking portion 41 is received in the guiding groove 33, it enables the locking portion 41 to be accurately connected to the latching portion 201 of the other connector 20*b*.

Figure 7:
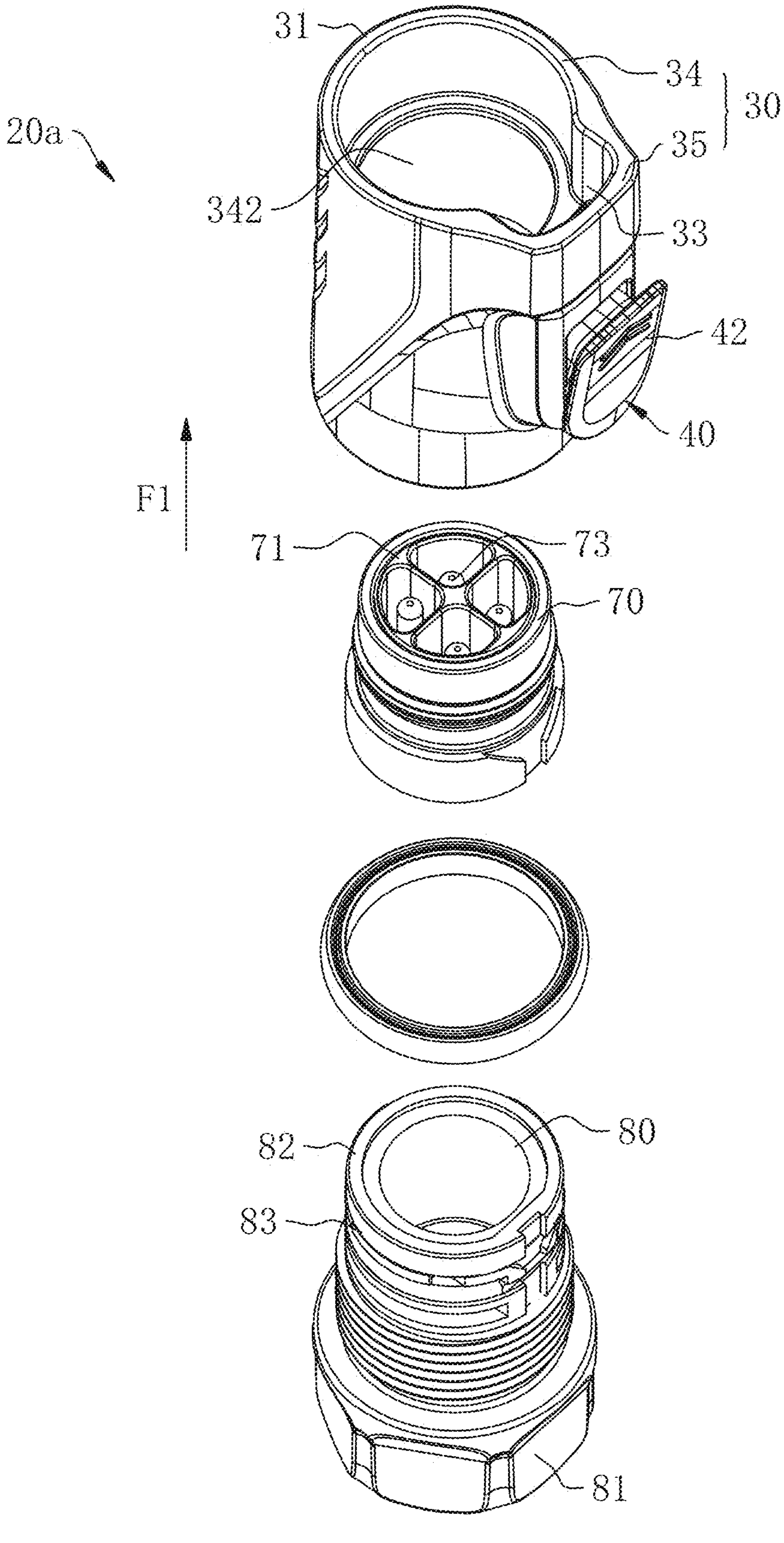
FIG. 7 is an exploded view of the connector of the connector module of FIG. 3.

In some embodiments, referring to FIG. 4 and FIG. 7, the outer shell 30 includes a main portion 34 and a convex portion 35 connected to the main portion 34. The locking portion 41 is received in the convex portion 35. The convex portion 35 provides a receiving space for the locking portion 41. An inner wall surface of the convex portion 35 may abut against the fastener 40, so as to balance the elastic force of the elastic member 50. In some embodiments, the inner wall surface of the convex portion 35 is used to abut against the bending portion 44. In some embodiments, the through groove 32 is defined in the convex portion 35. In some embodiments, the guiding groove 33 is surrounded by the inner wall surface of the convex portion 35. In some embodiments, the external section 422 is set out of the convex portion 35, and the middle section 421 is received in the convex portion 35.

In some embodiments, the elastic member 50 is held between the pressing portion 42 and the main portion 34, wherein the outer surface of the main portion 34 provides support for one end of the elastic member 50, while the pressing portion 42 abuts against the other end of the elastic member 50. Due to the position limit effect of the outer shell 30 on the fastener 40, the elastic member 50 can generate elastic force on the fastener 40. In some embodiments, when the bending point 44 is in contact with the inner wall surface of the outer shell 30, the elastic member 50 is in a compressed state and thus can generate elastic force.

In some embodiments, the other end of the elastic member 50 abuts against the middle section 421, facilitating the reduction of the length of the elastic member 50.

In some embodiments, referring to FIG. 5 and FIG. 6, a surface of the outer shell 30 facing to the pressing portion 42 is provided with a first position limit groove 36. One end of the elastic member 50 is received in the first position limit groove 36, so as to avoid displacement of the one end of the elastic member 50 and ensure the stability of the position of the elastic member 50. In some embodiments, the first position limit groove 36 is provided on the outer side of the main portion 34. In some embodiments, the outer shell 30 is provided with a circumferential wall 37, which encloses to form the first position limit groove 36. In some embodiments, the circumferential wall 37 is connected to the outer side of the main portion 34. In some embodiments, the outer shell 30 is provided with a column core 341. The circumferential wall 37 surrounds the column core 341 and is spaced from the column core 341 in the radial direction. In some embodiments, the column core 341 is inserted into one end of the elastic member 50, and the circumferential wall 37 surrounds an outer periphery of the one end of the elastic member 50.

In some embodiments, referring to FIG. 5 and FIG. 6, the pressing portion 42 is provided with a second position limit groove 423 at a side thereof facing to the outer shell 30. The other end of the elastic member 50 is received in the second position limit groove 423, thereby avoiding displacement of the other end of the elastic member 50 and ensuring the stability of the position of the elastic member 50. In some embodiments, the second position limit groove 423 is provided on a side of the middle section 421 facing to the outer shell 30.

In some embodiments, referring to FIG. 5 and FIG. 6, the connector 20*a* further includes a shaft 60, which serves as the rotating shaft. The shaft 60 inserted in the outer shell 30 and the fastener 40. At least one of the outer shell 30 and the fastener 40 can rotate relative to the shaft 60 freely, and a central axis of the shaft 60 coincides with the rotary axis, so that the fastener 40 can rotate relative to the outer shell 30 about the rotary axis. In some embodiments, the shaft 60 in inserted in the pivot portion 43 and the outer shell 30. In some embodiments, the shaft 60 is inserted in the pivot portion 43 and the convex portion 35.

In other embodiments, the fastener 40 may also rotate relative to the outer shell 30 through other structures. In some embodiments, shaft-shaped portions are integrally formed at two ends of the pivot portion 43, received in the outer shell 30 and limited at the position of the central axis, so that the fastener 40 can rotate relative to the outer shell 30 through other structures.

In some embodiments, the elastic member 50 is a compression spring, an elastic rubber block, or other component capable of providing elastic force to the fastener 40. In other embodiments, the elastic member 50 is a torsion spring, which is annular and mounted around the shaft 60, one end of the elastic member 50 abutting against the outer shell 30 and the other end abutting against the fastener 40. In some embodiments, the elastic member 50 may be integrally connected to the fastener 40, in a bent and deformed state by means of abutting against the outer shell 30, thereby generating elastic force on the fastener 40.

In some embodiments, referring to FIG. 4, FIG. 5, and FIG. 7, the connector 20*a* further includes a first insulation member 71 and a second insulation member 72 which are received in an inner shell 70. The first terminal 73 is inserted into the first insulation member 71 and the second insulation member 72. The first terminal 73 is conductive, wherein one end of the first terminal 73 is used to form electrical contact with the other connector 20*b*, and the other end of the first terminal 73 is fixedly connected to an electrical cable. In some embodiments, the other end of the first terminal 73 is fixed to the electrical cable by welding or crimping. In some embodiments, the first terminal 73 is made of a metal conductor. The first insulation member 71 and the second insulation member 72 encapsulate the first terminal 73, providing support for the first terminal 73 and keeping the first terminal 73 in a stable position. In addition, the first insulation member 71 and the second insulation member 72 have insulation properties, so as to prevent short circuits between the first terminal 73 and the outer shell 30.

In some embodiments, referring to FIG. 4 and FIG. 5, the connector 20*a* further includes inner shell 70 and a tailpipe 80. The inner shell 70 and tailpipe 80 are received in the outer shell 30. A rear end of the inner shell 70 is connected to and communicates with one end of the tailpipe 80. The outer shell 30 is configured to be open at two ends thereof. The inner shell 70 and tailpipe 80 both are made of insulating materials. The inner shell 70 and tailpipe 80 are arranged in opposite directions between the two ends of the outer shell 30, so as to form an insulated space inside the outer shell 30. The inner shell 70 is set close to the connecting end 31 of the outer shell 30 relative to the tailpipe 80. In some embodiments, an end of the inner shell 70 away from the connecting end 31 is defined as the rear end.

In some embodiments, referring to FIG. 4 and FIG. 7, the outer shell 30 is further provided with a main chamber 342 therein, which acts as a receiving space. The inner shell 70 is received in the main chamber 342. The main chamber 342 communicates with the guiding groove 33. In some embodiments, the main portion 34 constructs the majority of the boundary of the main chamber 342.

In some embodiments, referring to FIG. 5 and FIG. 7, a sealing ring 82 is mounted around an end of the tailpipe 80 facing to the inner shell 70. The sealing ring 82 abuts against one end of the inner shell 70. At a joint position of the inner shell 70 and the tailpipe 80, the sealing ring 82 is pressed against between end ports of the tailpipe 80 and inner shell 70, so as to fill a gap between the tailpipe 80 and the inner shell 70 and prevent liquid from entering the tailpipe 80 and the inner shell 70 through such gap.

Figure 10:
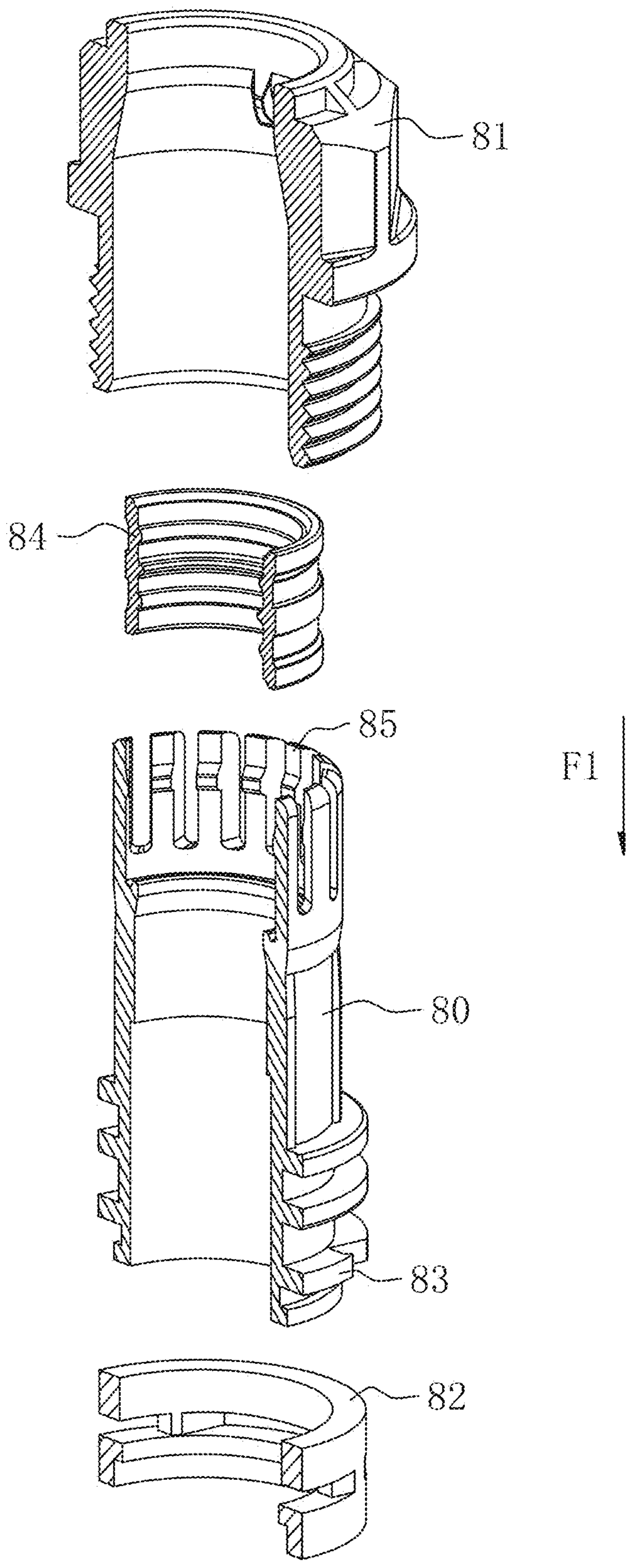
FIG. 10 is a partial, cross sectional view of the connector of FIG. 8.

In some embodiments, referring to FIG. 7 and FIG. 10, the sealing ring 82 is mounted around an outer circumference of the tailpipe 80. The outer circumference of tailpipe 80 is provided with a position limit protrusion 83, which is embedded into the sealing ring 82. A direction in which the tailpipe 80 moves in the outer shell 30 is perpendicular or nearly perpendicular to a direction in which the position limit protrusion 83 is embedded into the sealing ring 82. Therefore, the limit protrusion 83 can generate a pushing force on the sealing ring 82 along the axial direction of the tailpipe 80, preventing the sealing ring 82 from detaching from the end of the tailpipe 80 and ensuring the connection stability between the sealing ring 82 and the tailpipe 80.

In some embodiments, referring to FIG. 4 and FIG. 5, the first insulation member 71 and the second insulation member 72 are received in the inner shell 70. The inner shell 70 provides a limit to the position of the first insulation member 71 and the second insulation member 72 relative to the outer shell 30. In some embodiments, the inner shell 70 is provided with a position limit step surface 75, which is set away from the connecting end 31 of the outer shell 30. The position limit step surface 75 abuts against one side of the first insulation member 71, and the second insulation member 72 is set at another side of the first insulation member 71. When the second insulation member 72 is clamped onto the inner wall surface of the inner shell 70, it may enable the first insulation member 71 to be limited within the inner shell 70.

Figure 9:
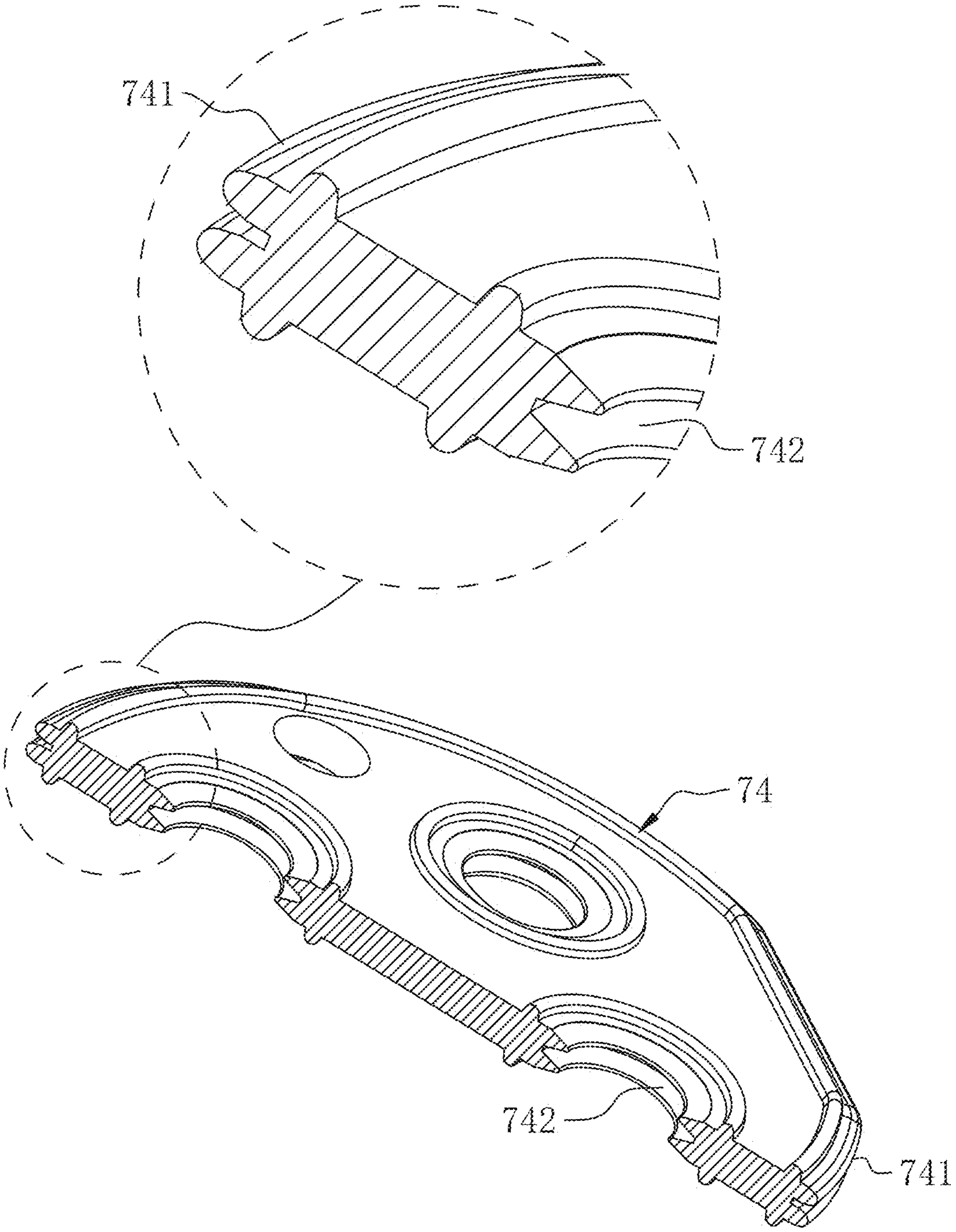
FIG. 9 is a cross sectional view of a sealing gasket of the connector of FIG. 4.

In some embodiments, referring to FIG. 6 and FIG. 9, the connector 20*a* further includes a sealing gasket 74. The sealing gasket 74 is held between the first insulation member 71 and the second insulation member 72. The first terminal 73 is inserted into the sealing gasket 74. The sealing gasket 74 also abuts the inner wall surface of the inner shell 70 in the radial direction. By means of setting the first insulation member 71 and the second insulation member 72 at two opposite sides of the sealing gasket 74, respectively, the first insulation member 71 and the second insulation member 72 can play a role in position limit for the sealing gasket 74. By means of fitting the outer circumference of the first terminal 73 and the inner circumference of the inner shell 70, the sealing gasket 74 can fill a gap between two ends of the inner shell 70, thereby preventing liquid at the connecting end 31 from entering the connector 20*a* through the gap in the inner shell 70 and coming into contact with exposed electrical cables.

In some embodiments, referring to FIG. 9, an outer circumference of the sealing gasket 74 is provided with a first circumferential flange 741. The first circumferential flange 741 abuts against the inner wall surface of the inner shell 70 in the radial direction, and has an axial width decreasing radially and outwardly from the outer circumference of the sealing gasket 74. Due to the decreased width of the first circumferential flange 741, an outer edge of the first circumferential flange 741 has greater flexibility and is more prone to generate deformation, allowing the first circumferential flange 741 to fully fitting the inner wall surface of the inner shell 70, thereby improving the sealing effect of the sealing gasket 74.

In some embodiments, referring to FIG. 9, an inner circumference of the sealing gasket 74 is provided with a second circumferential flange 742. The second circumferential flange 742 abuts against an outer circumferential surface of the first terminal 73 in the radial direction, and has a width decreasing radially and inwardly from the inner circumference of the sealing gasket 74. Due to the decreased width of the second circumferential flange 742, an inner edge of the second circumferential flange 742 has greater flexibility and is more prone to generate deformation, allowing the second circumferential flange 742 to fully fitting the outer circumferential surface of the first terminal 73, thereby improving the sealing effect of the sealing gasket 74.

Figure 8:
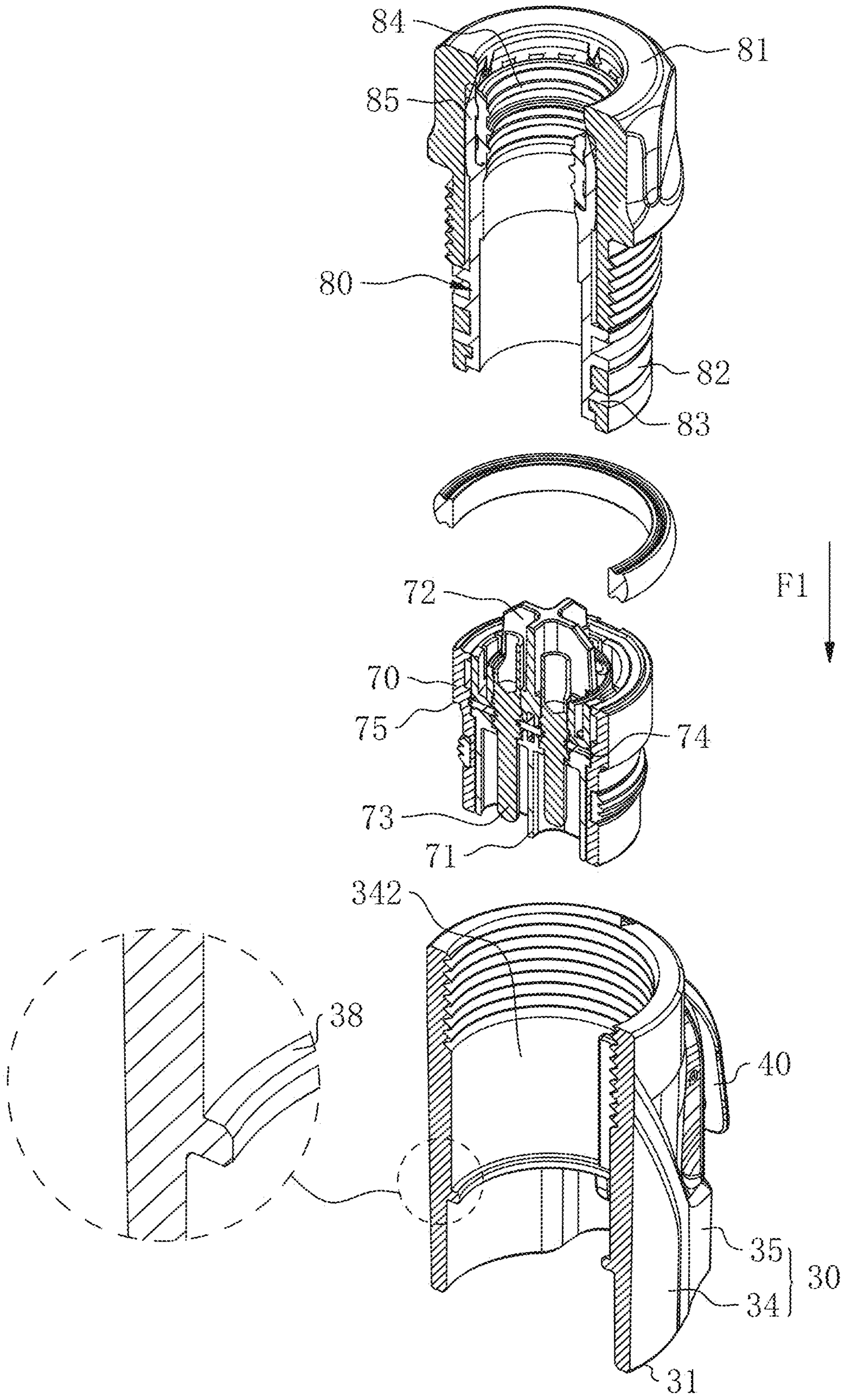
FIG. 8 is an exploded view of the connector of the connector module of FIG. 3 from another aspect.

In some embodiments, referring to FIG. 4, FIG. 6, and FIG. 8, the connector 20*a* further includes a fastening cap 81 threaded in the outer shell 30. The outer shell 30 is provided with a position limit step surface 38 at the inner side thereof. The position limit step surface 38 is set away from the connecting end 31. The inner shell 70 abuts against the position limit step surface 38, the end of the inner shell 70 that is away from the connecting end 31 abuts against one end of the tailpipe 80, and the other end of the tailpipe 80 is received in the fastening cap 81 and abuts against an inner wall surface of the fastening cap 81. The inner shell 70 and the tailpipe 80 abut against with each other and have similar diameters, and threaded nesting fit is no longer formed between ports of the inner shell 70 and the tailpipe 80, which will not cause any restriction on the inner diameter of either the inner shell 70 or the tailpipe 80, ensuring that both the inner shell 70 and the tailpipe 80 have sufficient space to accommodate electrical cables or insulation members. Specifically, the insulation members include the first insulation member 71 or the second insulation member 72. When the threaded fit between the fastening cap 81 and the outer shell 30 is tightened, the fastening cap 81 retracts into the outer shell 30, generating a greater force on the other end of the tailpipe 80. The inner shell 70 is limited between the position limit step surface 38 and the tailpipe 80.

In some embodiments, referring to FIG. 4 and FIG. 10, electrical cables extend through the other end of tailpipe 80. The connector 20*a* further includes a sealing ring 84 that is mounted around the electrical cables and received in the other end of tailpipe 80. The other end of the tailpipe 80 is provided with several claw pieces 85, which are distributed at intervals along an outer circumference of the sealing ring 84. In a direction away from the connecting end 31, a part of an inner circumferential surface of the fastening cap 81 contracts. When the fastening cap 81 is retracted into the outer shell 30, the several claw pieces 85 contract under the abutment of the inner circumferential surface of the fastening cap 81, applying a force on the outer circumference of the sealing ring 84, so that the sealing ring 84 can contact the outer circumference of the electrical cables closely, which is conducive to preventing liquid from entering the connector 20*a* through the gap between the fastening cap 81 and the electrical cables.

The above descriptions are only preferred embodiments of the present disclosure, which are further detailed descriptions of the present disclosure in conjunction with specific preferred embodiments, and it cannot be considered that the specific implementation of the present disclosure is limited to these descriptions. Any modifications, equivalents, improvements, etc. made within the spirit and principle of the present disclosure shall all fall within the protection scope of the present disclosure.

What is claimed is:

1. A connector, comprising:

an outer shell comprising a connecting end and a rear end that are opposite to each other in an insertion direction, the connecting end being located at a front end of the outer shell in the insertion direction, a receiving space being defined in the outer shell, an opening being defined in the connecting end of the outer shell, wherein a direction from the front end towards the rear end of the outer shell is opposite to the insertion direction;

a first terminal being fixed in the receiving space of the outer shell;

a fastener being connected to the outer shell and rotatable relative the outer shell about a rotary axis, the fastener comprising a locking portion and a button that are connected to each other, the locking portion being set in the outer shell and extending towards the opening of the outer shell, the button comprising a pressing portion that is capable of being operated from an outside of the outer shell, wherein, along the insertion direction, the pressing portion of the button is set at a front end of the rotary axis, and the locking portion is set at a front end of the pressing portion of the button;

an elastic member being connected to the fastener and generating an elastic force on the fastener, which is capable of causing the button to move towards the outside of the outer shell.

2. The connector according to claim 1, wherein, along the insertion direction, the pressing portion is at least partially located between the locking portion and the rotary axis.

3. The connector according to claim 1, wherein the button comprises a front end and a rear end that are opposite to each other along the insertion direction, the pressing portion is set adjacent to the front end of the button, and the rear end of the button is rotatably connected to the outer shell through a rotating shaft.

4. The connector according to claim 1, wherein the pressing portion comprises a middle section and an external section, the middle section is set between the rotary axis and the locking portion, the external section is connected to an end of the middle section away from the outer shell, and at least a part of the external section extends in a direction away from the rotary axis relative to the middle section.

5. The connector according to claim 1, wherein, in a natural state, an outer surface of the button is inclined and extends gradually towards the outer shell along a direction from the front end to the rear end of the button.

6. The connector according to claim 5, wherein the fastener further comprises a bending portion connected to the pressing portion, the bending portion is connected between the pressing portion and the locking portion, the locking portion is connected to a side of the bending portion away from an inner wall surface of the outer shell, and the locking portion extends substantially along the insertion direction.

7. The connector according to claim 5, wherein the outer shell is provided with a through groove, and the pressing portion is received in the through groove partially.

8. The connector according to claim 5, wherein a part of an inner wall surface of the outer shell is recessed towards an outer wall surface of the outer shell to form a guiding groove which extends to the connecting end of the outer shell, and the locking portion is received in the guiding groove.

9. The connector according to claim 1, wherein the outer shell comprises a main portion and a convex portion connected to the main portion, the locking portion is received in the convex portion, and the elastic member is held between the pressing portion and the main portion.

10. The connector according to claim 1, wherein the locking portion is provided with a locking block or a locking slot; and wherein, when the locking portion is provided with the locking block, the locking block is provided with a guiding slope and a locking surface, and the guiding slope is inclined relative to the locking surface.

11. The connector according to claim 1, wherein a surface of the outer shell facing to the pressing portion is provided with a first position limit groove, and an end of the elastic member is received in the first position limit groove; and, a side of the pressing portion facing to the outer shell is provided with a second position limit groove, and another end of the elastic member is received in the second position limit groove.

12. The connector according to claim 1, further comprising an inner shell and a tailpipe received in the outer shell, and a rear end of the inner shell connected to and communicating with one end of the tailpipe.

13. The connector according to claim 12, further comprising a fastening cap threaded in the outer shell, wherein an inner side of the outer shell is provided with position limit step surface which is away from the connecting end, the inner shell abuts against the position limit step surface, an end of the inner shell away from the connecting end abuts against the one end of the tailpipe, another end of the tailpipe is received in the fastening cap and abuts against an inner wall surface of the fastening cap.

14. The connector according to claim 13, wherein a sealing ring is mounted around the one end of the tailpipe facing to the inner shell, and abuts against an end of the inner shell.

15. The connector according to claim 12, further comprising a first insulation member, a second insulation member, and a sealing gasket, wherein the first insulation member and the second insulation member are received in the inner shell, the sealing gasket is held between the first insulation member and the second insulation member, the first terminal is inserted in the first insulation member, the second insulation member, and the sealing gasket; wherein an outer circumference of the sealing gasket is provided with a first circumferential flange which abuts against the inner wall surface of the inner shell and has a width decreasing along a direction towards the outer circumference; or an inner circumference of the sealing gasket is provided with a second circumferential flange which abuts against an outer circumferential surface of the first terminal and has a width decreasing along a direction towards the inner circumference.

16. The connector according to claim 12, wherein a sealing ring is mounted around an end of the tailpipe facing to the inner shell, and a position limit protrusion is provided on an outer circumference of the tailpipe and embedded in the sealing ring.

17. A connector module, comprising a first connector and a second connector, wherein the first connector is the connector defined in claim 1;

the second connector comprises a housing, a latching portion being fixed on the housing and configured for cooperating with the locking portion of the first connector, and a second terminal at least partially received in the housing;

when the first connector and the second connector are plugged and connected, the second terminal is in contact with and electrically connected to the first terminal.

* * * * *